Patented Dec. 12, 1922.

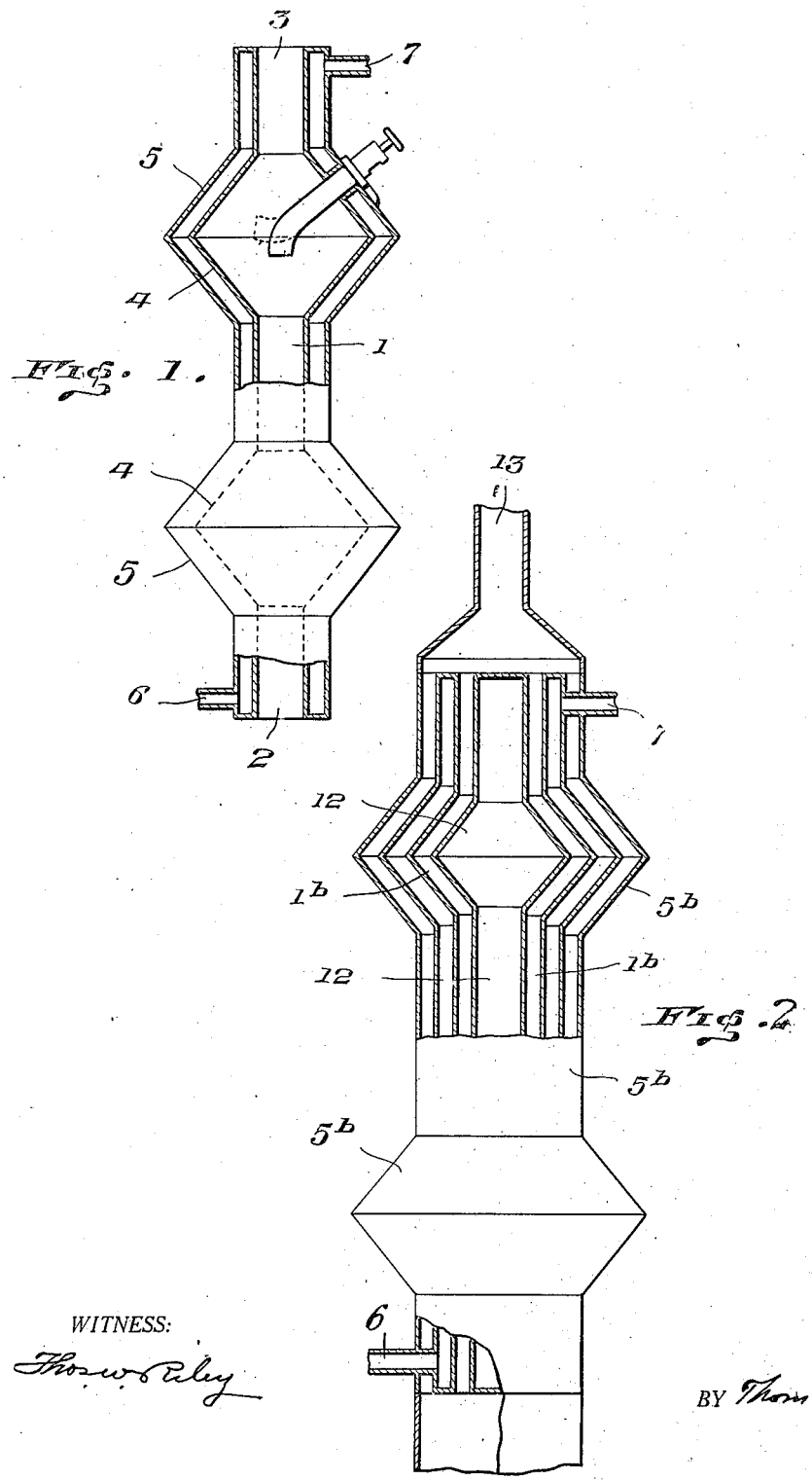

1,438,259

UNITED STATES PATENT OFFICE.

THOMAS D. PILCHER, OF WASHINGTON, DISTRICT OF COLUMBIA.

WATER HEATER.

Application filed September 11, 1918. Serial No. 253,551.

*To all whom it may concern:*

Be it known that I, THOMAS D. PILCHER, a citizen of the United States, residing at Washington, in the District of Columbia, have invented certain new and useful Improvements in Water Heaters, of which the following is a specification.

The invention relates to water heaters, the object thereof being in general to utilize units of heat which hitherto have been carried away with products of combustion and wasted.

Referring to the drawing—

Figure 1 represents a partial vertical section of a water heater provided with my improvements.

Figure 2 represents a similar view of a modification.

In Fig. 1, 1 represents a smoke flue open at its lower end 2 for the reception of products of combustion from any suitable source, such as a gas stove or a wood or coal burning stove or furnace, and open at its upper end 3 for the discharge of the products of combustion. The smoke flue as shown is provided with a plurality of enlargements 4 of double truncated conical form, although in some instances only a single enlargement may be required.

The smoke flue is surrounded by a jacket 5 conforming to the shape of the smoke flue and its enlargements, there being a space between the smoke flue and the jacket for water. Water is supplied to this space through an inlet 6 and flows therefrom through an outlet 7.

The water space is, as will be seen, devious in character and of varying capacities throughout the successive portions of its length, so that the water in passing each of the enlargements flows with varying velocities. Water passing the first half of one of the enlargements is decelerated in its flow, but the flow is accelerated as said water passes the second half of said enlargements. There is therefore a period of retardation during which the water may become highly heated by the utilization of heat units taken from the products of combustion flowing through the interior of the enlargement. The transfer of heat units is further aided by the eddying and detention of the smoke and the products of combustion within the enlargement. The products of combustion, therefore, escape from the upper end of the smoke flue deprived of a very large portion of their heat.

The construction shown in Fig. 2 comprises an addition to the water jacket and the smoke flue revealed in Fig. 1, an outside smoke flue $5^b$ which is in communication with the same source of products of combustion as the smoke flue 1 of Fig. 1. The central smoke flue $1^b$ in this modification is somewhat larger in diameter than the smoke flue 1 of Fig. 1, and is provided with a closed core 12 spaced from and conforming to the shape of the flue $1^b$. The object of this core is to compel the products of combustion to flow into intimate relation to the wall of the smoke flue $1^b$ so as to heat said wall to the greatest possible extent. The inlet 6 and the outlet 7 for water are the same as those shown in Fig. 1. The device is provided with an outlet flue 13 for receiving and carrying away products of combustion flowing through the spaces on either side of the water chamber of the device.

It will be understood that products of combustion are, in this construction, brought into intimate relation with both the inner and the outer wall of the water heater, and that, furthermore, the products of combustion flowing through the device are retarded and caused to eddy, whereby a maximum transfer of heat units to the water within the water heater may be effected. The device may be attached to any kind of heater, or it may simply be placed upon an ordinary cooking stove or gas range and receive heat therefrom in the same manner as an ordinary cooking utensil or tea kettle. Said device may also be connected with the smoke flue of any kind of combustion apparatus, being in such case disposed between said combustion apparatus and the chimney flue. The pipes 6 and 7 may be connected with a water reservoir in which hot water is to be retained.

What I claim as new and desire to secure by Letters Patent is:

1. A water heater comprising a smoke flue having an inlet and an outlet for products of combustion, and a jacket for said flue having an inlet and an outlet for water, said flue and said jacket being each provided with a water-deflecting enlargement of double truncated conical formation.

2. A water heater comprising an inner smoke flue having an inlet and an outlet for the products of combustion and an enlargement, an outer smoke flue having an enlargement, and a receptacle for water between the inner and outer flues the walls of which correspond with the enlargements in the two flues.

3. A water heater comprising a smoke flue having an inlet and an outlet for products of combustion, a jacket for said flue having an inlet and an outlet for water, and a core spaced from and within said flue, said flue, said jacket and said core having corresponding water-deflecting enlargements.

4. A water heater comprising a smoke flue having an inlet and an outlet for products of combustion, a jacket for said flue having an inlet and an outlet for water, a core spaced from and within said flue, and a smoke flue spaced from and surrounding said jacket.

5. A water heater comprising a smoke flue having an inlet and an outlet for products of combustion, a jacket for said flue having an inlet and an outlet for water, a core spaced from and within said flue, and a smoke flue spaced from and surrounding said jacket, said elements all being provided with corresponding deflecting enlargements.

In testimony whereof I affix my signature.

THOMAS D. PILCHER.